(12) United States Patent
Cueman

(10) Patent No.: US 11,364,461 B2
(45) Date of Patent: Jun. 21, 2022

(54) AIR FILTRATION MEDIA WITH PERFORMING ENHANCING ADDITIVES AND METHOD FOR APPLICATION THEREOF

(71) Applicant: PPA Industries, Inc., Hickory, NC (US)

(72) Inventor: Glenn F. Cueman, Denver, NC (US)

(73) Assignee: PPA Industries, Inc., Hickory, NC (US)

( * ) Notice: Subject to any disclaimer, the term of this patent is extended or adjusted under 35 U.S.C. 154(b) by 181 days.

(21) Appl. No.: 16/723,055

(22) Filed: Dec. 20, 2019

(65) Prior Publication Data

US 2020/0122077 A1 Apr. 23, 2020

Related U.S. Application Data

(62) Division of application No. 15/630,352, filed on Jun. 22, 2017, now Pat. No. 10,543,447.

(60) Provisional application No. 62/353,070, filed on Jun. 22, 2016.

(51) Int. Cl.
*B01D 53/02* (2006.01)
*B01D 46/52* (2006.01)
*B01D 46/00* (2022.01)

(52) U.S. Cl.
CPC ....... *B01D 46/521* (2013.01); *B01D 46/0001* (2013.01); *B01D 46/0005* (2013.01); *B01D 46/0028* (2013.01); *B01D 46/0038* (2013.01); *B01D 2279/65* (2013.01)

(58) Field of Classification Search
CPC ............ B01D 2279/65; B01D 46/0001; B01D 46/0005; B01D 46/0028; B01D 46/0038; B01D 46/521
See application file for complete search history.

(56) References Cited

U.S. PATENT DOCUMENTS

| | | |
|---|---|---|
| 4,411,948 A | 10/1983 | Ogino et al. |
| 5,338,340 A | 8/1994 | Kasmark, Jr. et al. |
| 5,350,443 A | 9/1994 | von Blucher et al. |
| 6,099,901 A | 8/2000 | Cronia et al. |
| 2002/0152890 A1 | 10/2002 | Leiser |
| 2006/0272508 A1 | 12/2006 | Hoke et al. |

*Primary Examiner* — Christopher P Jones
(74) *Attorney, Agent, or Firm* — Nexsen Pruet, PLLC; Seth L. Hudson

(57) ABSTRACT

The present invention provides methods and systems for an air filter that includes a filtration material having at least one surface, an enclosed frame surrounding said filter material but exposing said one surface, said filter material having intermittent geometric shapes of latex on said at least one surface, said latex containing an enhanced additive.

17 Claims, 2 Drawing Sheets

AIR FILTRATION MEDIA WITH PERFORMING ENHANCING ADDITIVES AND METHOD FOR APPLICATION THEREOF

CROSS REFERENCE TO RELATED PATENT APPLICATION

This application is a divisional of co-pending U.S. patent application Ser. No. 15/630,352, filed Jun. 22, 2017, and entitled "AIR FILTRATION MEDIA WITH PERFORMING ENHANCING ADDITIVES AND METHOD FOR APPLICATION THEREOF," which claims priority from U.S. Provisional Patent Ser. No. 62/353,070 filed Jun. 22, 2016 and entitled "METHOD FOR APPLICATION OF PERFORMING ENHANCING ADDITIVES ONTO AIR FILTRATION MEDIA," the contents of which are incorporated by reference herein.

FIELD OF THE INVENTION

The present invention relates generally to the addition of performing enhancing additives to an air filtration media, and more generally relates to the addition of intermittent geometric shapes of latex on the surface of an air filtration media that contain an enhanced additive.

BACKGROUND OF THE INVENTION

It is known to apply to non woven media dots of various shapes, as well as lines and other geometric shapes. Such geometric shapes were being printed in a variety of thicknesses. The purpose of the printing application was to thicken or stiffen the material for use as a garment interlining. In other applications, dots and other shapes have been printed onto non woven, knitted and woven fabrics for the purpose of creating an abrasive or high friction surface for cleaning or gripping (hospital socks having gripping media). Importantly, the dots, shapes, or lines are typically spaced apart, allowing significant spaces between them. The materials from which the dots, shapes or lines were made included a variety of polymeric materials, often resulting from liquid emulsions of fine powders, pigments, and binders which are subsequently cured and/or polymerized on the surface of the fabric through the application of heat. Some versions can be cured through other means, including the addition of catalysts, UV, or other means.

Air filtration filters have become increasingly able to trap very fine particulates, including particles as small as sub micron in size. However, new problems have arisen that potentially affect the performance of the filter. As an example, filters using current technology can actually trap particles as small as bacteria, fungus, and mold spore. Air filters in residential and commercial applications often exist in dark, warm, moist spaces, which is an ideal environment for microbiological growth. This microbial growth in and on the air filter can cause odors which are distributed throughout the residence or business. It also actually shortens the life of the filter, with microbiological growth actually restricting airflow, leading to premature replacement. Additives may be incorporated into and onto air filtration media through several methods. One method includes mixing them into the binder of the fibers (on binder based non wovens). The problems with this method include the potential for the binder to encapsulate the additives, rendering them ineffective.

Additionally, the inclusion of the additives can adversely impact the curing of the binder resulting in poor fabric structure and filtration performance. Another method for producing non woven fabrics is the use of bicomponent fibers which have a layer of lower melt temperature polymer allowing the fibers to bond together with the application of temperature and form the non woven fabric. In this method of fabric construction, the additives must be incorporated directly into the fiber when it is extruded. The additives can be encapsulated and rendered ineffective, or the additives can actually interfere with the extrusion process, slowing production or affecting fiber quality. Similar issues result with meltblown or meltspun non woven fabrics, where the additives are incorporated directly into the fibers as they are formed. In another method of treating fabrics with additives, silane based coatings containing the additives are applied directly onto the fabrics. Several issues are associated with this method. First, the silane coatings are applied to the entire surface of the fabric, typically wetting the entire fabric, and then are cured in place. This can affect the filtration performance characteristics of the fabric, often increasing the resistance to airflow and interfering with electrostatic treatments. Additionally, this type of coating is often not compatible with porous particulate additives, effectively plugging the pores.

The present invention solves all the potential problems set forth above by using a method of printing dots, shapes or lines or other intermittent geometric shapes onto filtration media, leaving significant spacing between the printed dots, shapes, or lines. Airflow is very minimally affected versus coating the entire fabric. Additionally, the thickness of the dots, shapes, or lines can be closely controlled, allowing thicker or thinner application as required for different types of additives. The intermittent geometric shapes are applied in an aqueous latex base and then cured on the filtration media by heating, chemical reaction, U.V. curing or other known methods. The intermittent geometric shapes can be applied to the filtration media by a printing process.

BRIEF SUMMARY OF THE INVENTION

According to an embodiment of the present invention, an air filter includes a filtration material having at least one surface, an enclosed frame surrounding said filter material but exposing said one surface. The filter material has intermittent geometric shapes of latex on said at least one surface with said latex containing an enhanced additive.

According to another embodiment of the present invention, the air filter includes an enhanced additive that contains at least one antimicrobial agent.

According to yet another embodiment of the present invention, the air filter includes an enhanced additive that contains at least one odor control additive.

According to yet another embodiment of the present invention, the air filter contains an enhanced additive contains at least one antimicrobial agent and at least one odor control additive.

According to yet another embodiment of the present invention, the air filter contains zinc pyrithione or silver based compounds as the antimicrobial agent.

According to yet another embodiment of the present invention, the air filter contains carbon, natural or synthetic zeolites, molecular sieves, silica gel, and/or baking soda as the odor control additives.

According to yet another embodiment of the present invention, the air filter contains a latex base in the shape of a circular dot.

According to yet another embodiment of the present invention, the air filter contains a latex base in the shape of a square.

According to yet another embodiment of the present invention, the air filter contains a filtration material that is folded in accordion fashion to form a plurality of v-shaped pleats and housed within a paper-board frame, said filter material having a plurality of latex deposits on at least the first side or second side of the filtration material, said latex containing an enhanced additive.

According to yet another embodiment of the present invention, the method of making an air filter that includes producing air filtration media, printing a latex base contains antimicrobial agents and/or odor control additives on said air filtration media.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
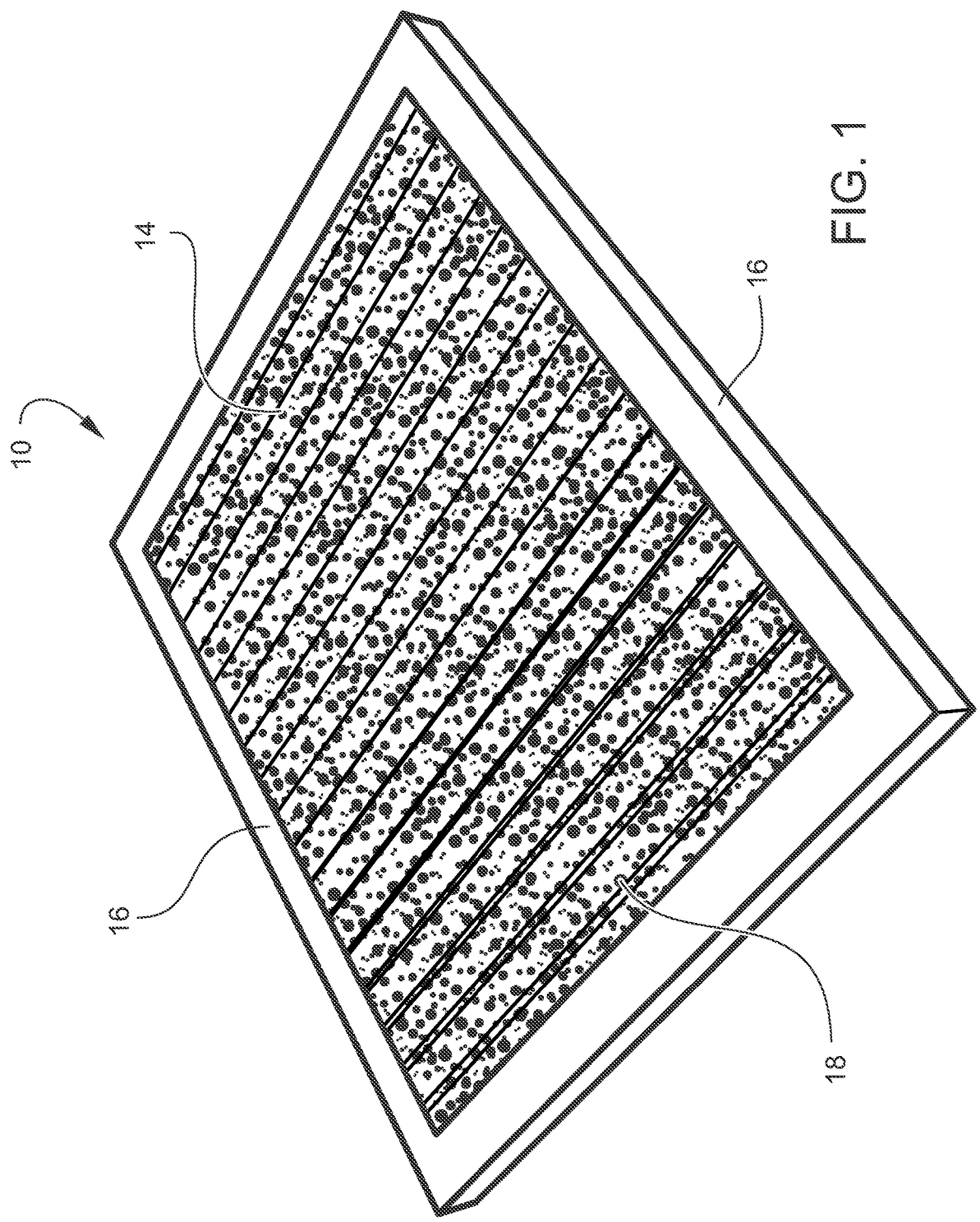
FIG. 1 is a top perspective view of an air filtration media for use with the present invention.
Figure 2:
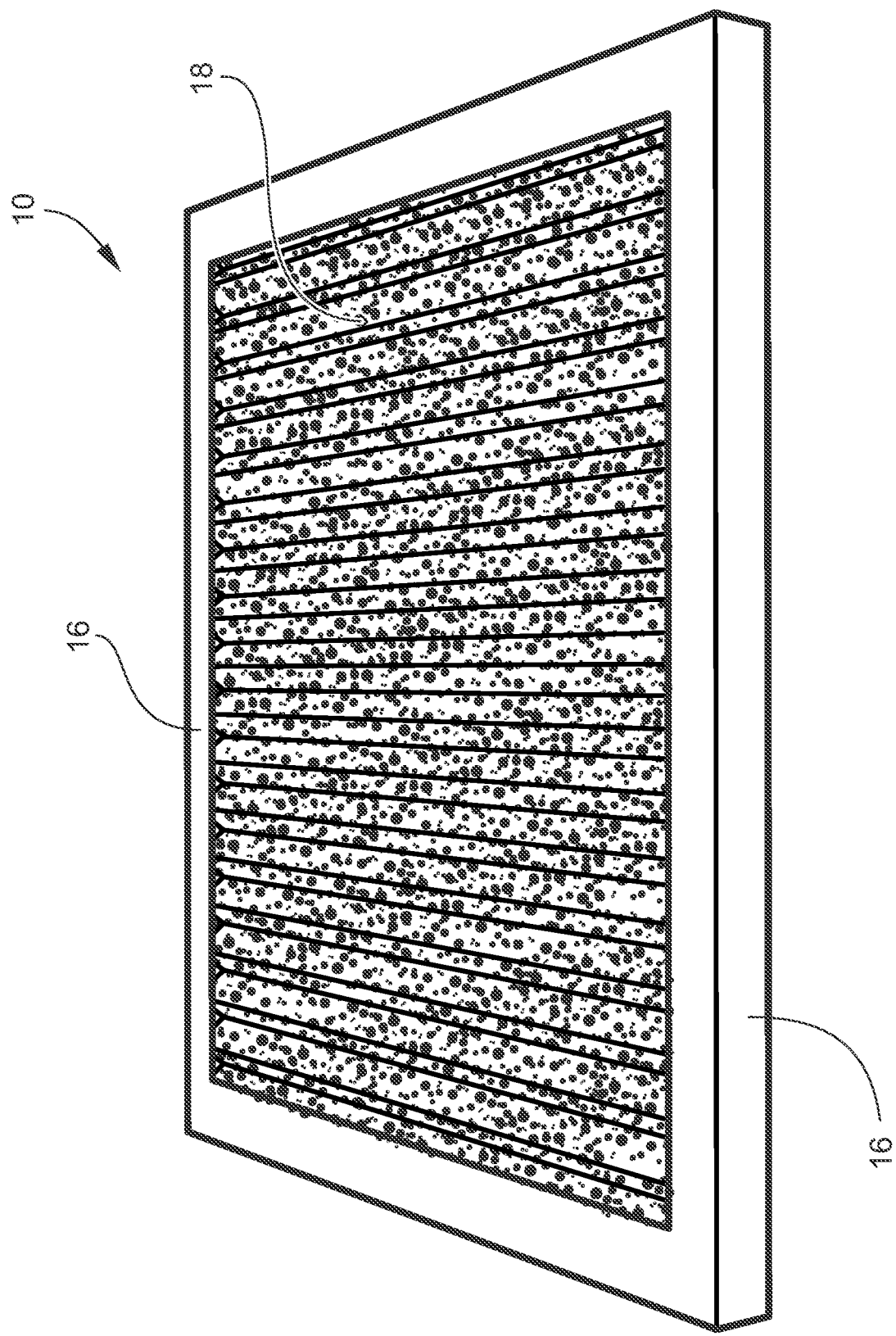
FIG. 2 is a side perspective view of an air filtration media for use with the present invention.

Referring now specifically to the drawings, an exemplary air filter is illustrated in FIG. 1 and is shown generally at reference numeral 10. The air filter 10 comprises a filtration media 14 having a first side and a second side that is composed of a non-woven web for blocking particulate matter carried by the air through common HVAC ductwork or air within livable space. The filtration media 14 is folded in accordion fashion to form a plurality of V-shaped pleats, and is housed in a rectangular, paper-board frame 16.

The filtration media 14 contains a plurality of deposits of an aqueous latex base 18. The deposits of the latex base 18 may be in the form of intermittent geometric shapes that are then cured on the filtration media 14 by heating, chemical reaction, U.V. curing or other known methods. The deposits of an aqueous latex base 18 can be applied to the filtration media 14 by a printing process. The deposits of the aqueous latex base 18 may have any number of shapes, but a generally circular dot is illustrated in the figures. In other alternative embodiments, the shapes may be squares, triangles, and the like.

The latex base 18 contains at least one additive that is incorporated into the latex base 18. Such additives may include antimicrobial additives, such as zinc pyrithione and silver based compounds, can be readily incorporated into the latex base 18 for depositing on a filtration media 14. Odor control additives such as carbon, natural and synthetic zeolites, molecular sieves, silica gels and baking soda may also be incorporated into the latex base 18 for depositing on a filtration media. Additionally, the latex base 18 may contain a pigment or color additive to make the latex base visible. By way of example, the latex base 18 may have blue pigment that allows it to be easily seen on the filtration media 14. The pigment or color additive may also designate the actual additive within the latex base 18. For example, a green colored latex base 18 may indicate an antimicrobial additive is present, while a red colored latex base 18 may indicate an antimicrobial additive and odor additive are present. The colors used herein are examples, and any color or color combination may be utilized for these intended purposes.

EXAMPLES

Example 1

Non woven fabrics were selected that were already widely used in air filtration applications. While still in full width form, in this case 105 inches, they were prepared to undergo a printing process using water based latex polymer emulsion. The emulsion to be applied to the fabric was prepared, and it included an antimicrobial compound, zinc pyrithione, in a percentage which would result in an amount added to the non woven fabric construction of 0.015 wt. %, based on the total weight of the fabric. The fabric was printed with dot shapes approximately 1 mm in diameter, and the dot shapes were approximately 4 mm apart from one another. After curing, the fabric was slit to an appropriate width to fabricate an air filter (19.75"). The fabric was then pleated and incorporated into a paperboard frame. Tests were performed on the media to compare resistance to airflow, also described as delta P, or back pressure. The results were compared to the same conventional media which was not printed or modified in any way with additives. The airflow was compared and found to be essentially identical. However, the particle removal efficiency was better with the enhanced additive (antimicrobial compound) of the present invention. It is speculated that the improved efficiency was due to the antimicrobial additive that prevented the proliferation of bacteria, mold, mildew, fungus etc., on the filter surface. In this way the filter removed more particles rather than become clogged with the bacteria, etc.

The test conditions included 300 CFM air flow, temperature of 76° F., 45% relative humidity, 29.03 in HG barometric pressure, and 110 FPM media velocity. A Met One 3413 particle counter was utilized.

Table 1 and 2 below illustrate test data for air filtration media of the present invention. Table 3 and 4 below illustrate test date for filtration media without an enhanced additive.

TABLE 1

Media Resistance to Air Flow

| Air FlowCFM | Air FlowVelocity-FPM | Resistance- in. wg |
|---|---|---|
| 125 | 45 | 0.05 |
| 250 | 90 | 0.10 |
| 375 | 135 | 0.16 |
| 500 | 180 | 0.23 |
| 625 | 225 | 0.30 |

TABLE 2

KCl Particle Removal Efficiency by Particle Size (Per ASHRAE 52.2 Test Standard)

| 0.30 to 1 Microns | | 1.0 to 3.0 Mircons | | 3.0 to 10.0 Microngs | |
|---|---|---|---|---|---|
| Mean Size | Efficiency % | Mean Size | Efficiency % | Mean Size | Efficiency % |
| 0.35 | 11.35 | 1.14 | 54.47 | 3.46 | 89.02 |
| 0.47 | 20.10 | 1.44 | 64.00 | 4.69 | 91.24 |
| 0.62 | 31.23 | 1.88 | 74.61 | 6.2 | 92.12 |
| 0.87 | 42.17 | 2.57 | 84.72 | 8.37 | 93.02 |
| Average Efficiency | 26.21 | Average Efficiency | 69.45 | Average Efficiency | 91.35 |

TABLE 3

Media Resistance to Air Flow

| Air FlowCFM | Air FlowVelocity-FPM | Resistance- In. wg |
|---|---|---|
| 125 | 45 | 0.05 |
| 250 | 90 | 0.10 |
| 375 | 135 | 0.15 |
| 500 | 180 | 0.22 |
| 625 | 225 | 0.28 |

TABLE 4

KCl Particle Removal Efficiency by Particle Size (Per ASHRAE 52.2 Test Standard)

| 0.30 to 1 Microns | | 1.0 to 3.0 Mircons | | 3.0 to 10.0 Microngs | |
|---|---|---|---|---|---|
| Mean Size | Efficiency % | Mean Size | Efficiency % | Mean Size | Efficiency % |
| 0.35 | 0.00 | 1.14 | 25.57 | 3.46 | 79.55 |
| 0.47 | 1.56 | 1.44 | 36.04 | 4.69 | 85.51 |
| 0.62 | 7.40 | 1.88 | 51.15 | 6.2 | 88.87 |
| 0.87 | 14.71 | 2.57 | 70.51 | 8.37 | 90.52 |
| Average Efficiency | 5.92 | Average Efficiency | 45.82 | Average Efficiency | 86.11 |

Example 2

A test of antimicrobial efficacy was performed. The printed fabric was tested using the Kirby-Bauer Susceptibility Test, Zone of Inhibition and found to have excellent antimicrobial performance against gram positive and gram negative bacteria. The sample size of the filtration media is 20 mm×20 mm with a Soybean Casein Digest Broth culture medium with a sterile saline inoculum carrier. The growth medium is Mueller-Hinton Agar. The test results are shown in Table 5:

TABLE 5

| Sample ID | Organism | Zone of Inhibition |
|---|---|---|
| 1 | Klebsiella pheumoniae ATCC 4352 | Inhibition of growth under sample and clear zone of inhibition surrounding the sample and zone width (11 mm) |
| | Staphylococcus aureus ATCC 6538 | Inhibition of growth under sample and clear zone of inhibition surrounding the sample and zone width (10 mm) |

In this test, the sample size was made to fit a Petri dish and the dots remained the same size (about 1 mm in diameter). As can be seen the zone of inhibition (that area beyond the area of the dot that remained organism free) was significantly greater than the dot size. Since the dots are spaced about 4 mm apart, and the zone of inhibition for each dot was even greater, the entire sample showed no signs of microorganism growth. Untreated samples had extensive bacterial growth on the surface of the fabric, while the fabric with the printed dots did not.

Example 3

In this example, a standard testing procedure was used for evaluating the effectiveness of various odor reduction media to remove volatile organic compounds (VOCs) in a specified environment. The testing procedure involves placing a known sample size of media (defined by its mass, surface area, etc.) in a sealed chamber equipped with a cross polytetrafluoroethylene (PTFE) stirring system that will slightly move air around the sample within the sealed chamber. The chamber is also configured with sample injection and removal ports which allow a known VOC concentration to be injected into the chamber and slightly moved around the sample. The VOC concentration will be monitored over time to determine the effectiveness of the sample to lower the concentration. At set time intervals, a small sample of the VOC atmosphere in the sealed chamber will be removed by a small syringe and analyzed by a Gas Chromatograph equipped with a Flame ionization Detection device. The effectiveness of the sample method can be determined by the amount of VOC reduced with respect to time. Toluene is the standard testing material for VOC removal primarily because it is a relatively small molecule.

Sample 1—This procedure involved making a known gas standard of the contaminant in air and moving gas standard over a known weight of filter material from the sample material. The gas standard was measured prior to exposing it to the filter material and after exposing it to the filter material. The amount absorbed by the media was determined. The filter media samples were evaluated using Toluene as the contaminant. It was determined that toluene reduction was 43.43%.

Comparative Data

Set forth below are various enhanced additives that are incorporated into a synthetic filter media. The first sample has no enhanced additive. The second sample has Oguard (a VOC reduction material) and Microban antimicrobial agent. The third sample is a layer or coating of Oguard and carbon. The fourth sample is a thick mat of carbon. These 4 samples were tested for VOC removal or reduction. As can be seen, only the thick carbon mat removed more VOC than the 43.43% toluene removal of the present invention. The thick carbon mat, however had a severe reduction in air flow efficiency unsuitable for air filters.

Four (4) different filter media samples were exposed to low levels of toluene in a static condition to determine the levels of toluene absorbed by the different media. The media tested were: Sample 1—KC Media—No Oguard—No Microban; Sample 2—Media KC with Oguard Additive and Microban; Sample 3—Oguard and Microban; and Sample 4—Thick Mat (carbon). The procedure involved placing 0.5000 grams of the media in a 50 ml sealed vessel containing 217 nanograms of toluene and exposing the media to the toluene for six (6) hours, the amount of toluene absorbed by the media was determined. The results are shown below:

| Sample | % Toluene Reduction |
|---|---|
| 1 | 12.96% |
| 2 | 27.25% |
| 3 | 33.13% |
| 4 | 49.10% |

When compared to untreated media there was a large differential in VOC reduction capacity, stated in a percentage reduction over specific time units. This validated the performance when compared to untreated media.

In summary, the tests described above confirm that the printing method of delivering the performance enhancing additives to conventional air filtration media did not impair the ability of the filter to remove particulate matter from the airstream (and may improve it), did not create a restriction to airflow or increase back pressure, and did provide a viable and efficient carrier for antimicrobial and/or odor reducing additives for conventional air filtration media.

What is claimed is:

1. A method of making an air filter with at least one enhanced additive, comprising:
   producing an air filtration media;
   printing a latex base containing the at least one enhanced additive on the air filtration media;
   folding the air filtration media to form a plurality of v-shaped pleats;
   incorporating the air filtration media into a paperboard frame; and
   wherein the latex base is in the form of at least one intermittent geometric shape.

2. The method of making an air filter according to claim 1, wherein the at least one enhanced additive contains at least one antimicrobial agent.

3. The method of making an air filter according to claim 1, wherein the at least one enhanced additive contains at least one odor control additive.

4. The method of making an air filter according to claim 2, wherein the at least one antimicrobial agent is zinc pyrithione.

5. The method of making an air filter according to claim 3, wherein the at least one odor control additive is selected from the group consisting of carbon, natural or synthetic zeolites, molecular sieves, silica gel, and/or baking soda.

6. The method of making an air filter according to claim 1, wherein the at least one intermittent geometric shape is a plurality of generally circular dots, squares, and/or lines.

7. The method of making an air filter according to claim 1, wherein the at least one enhanced additive contains at least one antimicrobial agent and at least one odor control additive.

8. A method of applying at least one enhanced additive to a non-woven fabric, comprising:
   providing the non-woven fabric having a first side and a second side;
   printing a plurality of intermittent deposits of a latex base over at least the first side of the non-woven fabric, the at least one enhanced additive is incorporated into the latex base;
   curing the latex base;
   folding the non-woven fabric to form a plurality of v-shaped pleats, wherein the plurality of intermittent deposits are disposed intermittently on the v-shaped pleats; and
   incorporating the non-woven fabric into a paperboard frame.

9. The method of applying at least one enhanced additive to a non-woven fabric according to claim 8, wherein the latex base is printed by a process using water based latex polymer emulsion.

10. The method of applying at least one enhanced additive to a non-woven fabric according to claim 8, wherein the at least one enhanced additive contains at least one antimicrobial agent.

11. The method of applying at least one enhanced additive to a non-woven fabric according to claim 8, wherein the at least one enhanced additive contains at least one odor control additive.

12. The method of applying at least one enhanced additive to a non-woven fabric according to claim 10, wherein the at least one antimicrobial agent is a zinc pyrithione.

13. The method of applying at least one enhanced additive to a non-woven fabric according to claim 11, wherein the at least one odor control additive is selected from the group consisting of carbon, natural or synthetic zeolites, molecular sieves, silica gel, and/or baking soda.

14. The method of applying at least one enhanced additive to a non-woven fabric according to claim 8, wherein the latex base is in the form of at least one geometric shape.

15. The method of applying at least one enhanced additive to a non-woven fabric according to claim 14, wherein the at least one geometric shape is a plurality of generally circular dots, squares, and/or lines.

16. The method of applying at least one enhanced additive to a non-woven fabric according to claim 8, wherein the enhanced additive contains at least one antimicrobial agent and at least one odor control additive.

17. A method of making an air filter with at least one enhanced additive, comprising:
   providing a non-woven fabric with a first side and a second side and a water based latex polymer emulsion with at least one enhanced additive;
   printing the water based latex polymer emulsion on at least the first side of the non-woven fabric in the form of at least one intermittent geometric shape;
   curing the water based latex polymer emulsion;
   folding the non-woven fabric to form a plurality of v-shaped pleats, wherein the water based latex emulsion is intermittently disposed on the v-shaped pleats; and
   incorporating the non-woven fabric into a paperboard frame.

* * * * *